(No Model.)
S. H. BOYNTON.
COVER OR BLANKET FOR ANIMALS.
No. 284,803. Patented Sept. 11, 1883.
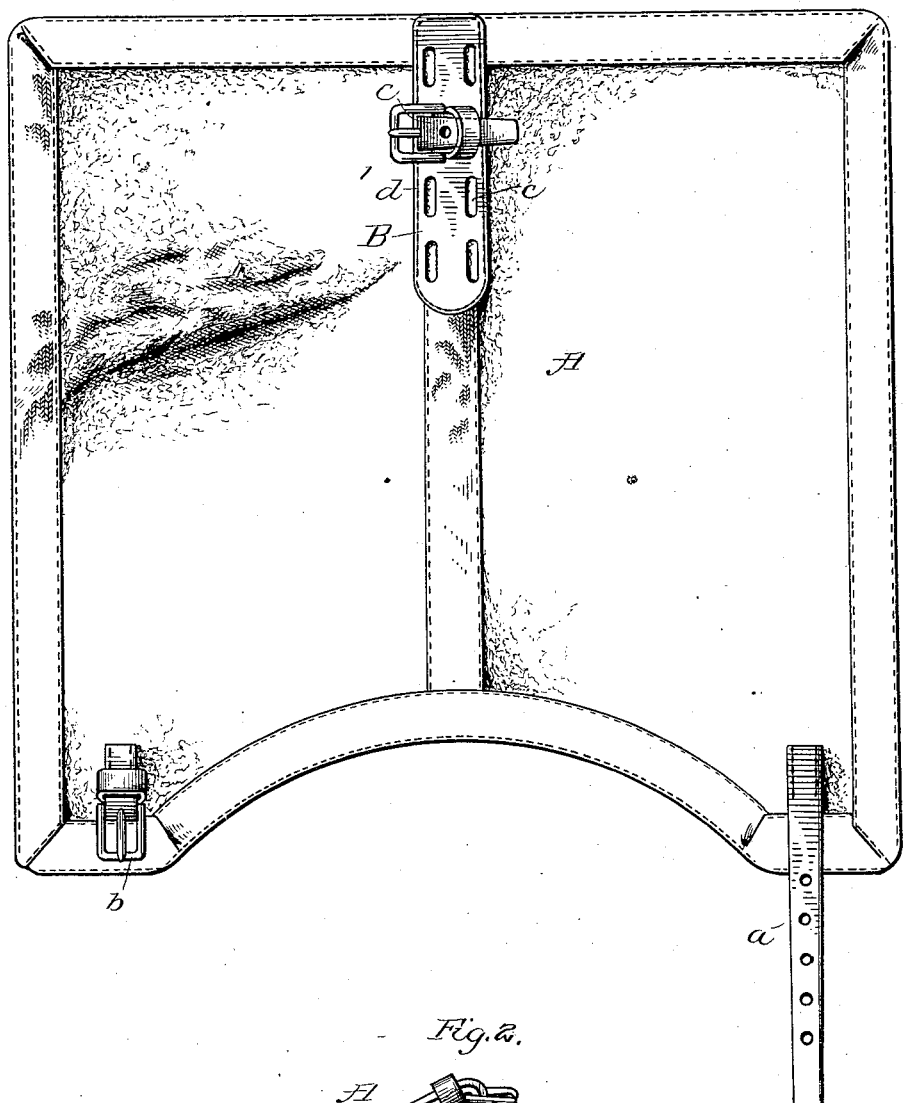
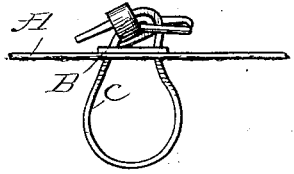

UNITED STATES PATENT OFFICE.

SUMNER H. BOYNTON, OF ROCKLAND, MAINE.

COVER OR BLANKET FOR ANIMALS.

SPECIFICATION forming part of Letters Patent No. 284,803, dated September 11, 1883.

Application filed February 21, 1883. (No model.)

To all whom it may concern:

Be it known that I, SUMNER H. BOYNTON, of Rockland, in the county of Knox and State of Maine, have invented a new and useful Improvement in Covers or Blankets for Animals; and I do hereby declare that the following is a full, clear, and exact description of the same.

My invention relates to an improvement in covers or blankets for horses and other animals; and its object is, first, to furnish means for securing the cover or blanket in place at the rear, as well as at the front, end; and, second, to make such securing devices adjustable, in order that the blanket may be used upon horses of different sizes.

The invention consists in the novel attachment to the rear of a horse-blanket, and, essentially, of a perforated plate and a removable loop passing laterally through said perforations and under the horse's tail, the device being thereby rendered capable of adjustment to any extent.

In the drawings, Figure 1 is a top view, and Fig. 2 an end view.

A represents an ordinary horse-blanket, cut away in the ordinary manner at the forward end, and provided with a strap and buckle, $a\ b$, for securing it around the neck of the animal. At the rear end of the blanket, and in the middle of such end, is firmly sewed or otherwise attached a plate, B, preferably of stiff leather, and extending from the end of the blanket a short distance up its central line. This plate is provided with two rows of perforations, $c\ d$, and the blanket beneath the plate has perforations, which register therewith.

C is a removable strap, which is passed through one of the perforations, as $c$, and its end carried under the tail of the horse, and then through the opposite perforation, $d$, as shown, and buckled, thus securing the blanket, the corners of which drop down in the usual way. It is evident, now, that for a large horse the strap would be passed through a pair of holes nearest the end of the blanket, while for a smaller blanket it would be moved toward the inner end. Any number of perforations may be provided.

I have found that in some blankets of fine quality the perforations may be worked directly in the blanket without the attachment of the leather plate; but I ordinarily prefer to use such plate.

Having described my invention, I claim—

1. Combined with a horse blanket or cover for animals, a perforated plate secured to the end thereof, and a removable strap or loop passing laterally through said perforations, for the purposes set forth.

2. The combination of the blanket, the plate B, a series of perforations through both blanket and plate, and a removable strap, substantially as described.

3. A blanket having a double row of perforations at the rear, in combination with a removable strap, substantially as described, and for the purpose set forth.

In testimony whereof I have signed my name to this specification in the presence of two subscribing witnesses.

SUMNER H. BOYNTON.

Witnesses:
W. T. COBB,
C. F. SIMMONS.